United States Patent
Malet

(10) Patent No.: US 9,809,683 B2
(45) Date of Patent: Nov. 7, 2017

(54) COPOLYMER WITH POLYAMIDE BLOCKS AND A POLYETHER BLOCK

(71) Applicant: Arkema France, Colombes (FR)

(72) Inventor: Frederic Malet, Lyons (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/027,603

(22) PCT Filed: Oct. 6, 2014

(86) PCT No.: PCT/EP2014/071332
§ 371 (c)(1),
(2) Date: Apr. 6, 2016

(87) PCT Pub. No.: WO2015/052127
PCT Pub. Date: Apr. 16, 2015

(65) Prior Publication Data
US 2016/0251484 A1  Sep. 1, 2016

(30) Foreign Application Priority Data

Oct. 7, 2013 (FR) ..................................... 13 59704

(51) Int. Cl.
*C08G 69/40* (2006.01)
*C08G 81/00* (2006.01)

(52) U.S. Cl.
CPC ............. *C08G 81/00* (2013.01); *C08G 69/40* (2013.01)

(58) Field of Classification Search
None
See application file for complete search history.

(56) References Cited

U.S. PATENT DOCUMENTS

| | | |
|---|---|---|
| 4,230,838 A | 10/1980 | Foy |
| 4,858,924 A | 8/1989 | Saito |
| 4,919,434 A | 4/1990 | Saito |
| 5,614,588 A * | 3/1997 | Steenblock ................ C08J 5/18 525/183 |
| 8,952,103 B2 | 2/2015 | Blondel |
| 2005/0165210 A1 | 7/2005 | Malet |
| 2010/0234539 A1* | 9/2010 | Malet ................ A63B 37/0093 525/436 |
| 2013/0202831 A1 | 8/2013 | Chhun |

FOREIGN PATENT DOCUMENTS

| | | |
|---|---|---|
| EP | 0156035 | 10/1985 |
| EP | 0857745 | 8/1998 |
| EP | 1482011 | 1/2004 |
| FR | 2273021 | 12/1975 |
| FR | 2846332 | 4/2004 |
| FR | 2965269 | 3/2012 |
| WO | 2008006987 | 1/2008 |

OTHER PUBLICATIONS

International Search Report and Written Opinion for International Application No. PCT/EP2014/071332, dated Oct. 10, 2014, 9 pages.
ISO Standard 1874-1:1992 "Plastics—Polyamide (PA) Materials for Molding and Extrusion—Part 1: Designation", 14 pages.

* cited by examiner

*Primary Examiner* — Ana Woodward
(74) *Attorney, Agent, or Firm* — RatnerPrestia

(57) ABSTRACT

The invention relates to a copolymer comprising at least two distinct polyamide blocks and at least one polyether block, and a method for preparation of said copolymer comprising the following steps: —in a first step, the polyamide block PA1 is prepared by polycondensation of chosen monomers: amino acids, lactames or diamines and dicarboxylic acids, in the presence of an appropriate chain limiter; —then, in a second optional step, the polyamide PA1 block obtained is reacted with all or part of the polyether PE blocks, in the presence or absence of a catalyst; —in a third step, the polyamide PA2 block is prepared by polycondensation of the chosen isomers: amino acids, lactams or diamines and dicarboxylic acids, in the presence of an appropriate chain limiter; —in a fourth optional step, the polyamide PA2 block obtained is reacted with all or part of the polyether PE blocks, in the presence or absence of a catalyst; —in a fifth step, PA1 or the reaction medium from step 2 is reacted with PA2 or the reaction medium from step 4 and with PE or the remainder of PE not added in step 2 or 4.

15 Claims, No Drawings

COPOLYMER WITH POLYAMIDE BLOCKS AND A POLYETHER BLOCK

CROSS-REFERENCE TO RELATED APPLICATIONS

This is the national phase of International Application No. PCT/EP2014/071332, filed 6 Oct. 2014, which claims priority from French Application No. 1359704, filed 7 Oct. 2013. The entire disclosure of each of these applications is incorporated herein by reference in its entirety for all purposes.

FIELD OF THE INVENTION

The present invention relates to a copolymer comprising at least two different polyamide blocks and at least one polyether block.

BACKGROUND OF THE RELATED ART

Copolymers bearing an amide block and an ether block are very flexible materials with good impact strength, but whose transparency is relatively poor (45% to 65% light transmission at 560 nm for a thickness of 2 mm), just like their polyamide homologs without ether units.

Polyamide blocks are known to be segments that are said to be rigid with a melting point (Tm) or glass transition temperature (Tg) higher than the working temperature of the polymer, whereas polyether blocks are segments that are said to be flexible with a Tm or Tg lower than the working temperature of said polymer.

Document FR 2 273 021 describes copolymers formed from polyamide blocks and polyether blocks, the polyamide blocks and the polyether blocks being linked via an ester function. These products are sold under the trade name PEBAX® by the company ARKEMA.

Copolymers bearing polyamide blocks (abbreviated hereinbelow as PA) and polyether blocks (abbreviated hereinbelow as PE) result from the copolycondensation of polyamide blocks bearing reactive end groups with polyether blocks bearing reactive end groups. For example, it is possible to react:
  polyether diol and a polyamide dicarboxylic acid,
  polyether diamine and a polyamide dicarboxylic acid,
  polyether diol and a polyamide diamine.

Polyamide blocks bearing dicarboxylic chain ends originate, for example, from the condensation of polyamide precursors in the presence of a chain-regulated dicarboxylic acid. Polyamide blocks bearing diamine chain ends originate, for example, from the condensation of polyamide precursors in the presence of a chain-regulating diamine. Thus, the bond between the blocks is either an ester bond or an amide bond.

Polymers bearing PA blocks and PE blocks may comprise only one PA block and only one PE block.

They may also comprise several PA blocks that are identical in terms of structure of the constituent monomer(s) of the polyamide and identical PE blocks randomly distributed. Said polymers may be prepared by simultaneous reaction of the PE blocks and of the precursors of the PA blocks. A polymer is then obtained containing PE blocks and PA blocks of very variable length depending on the time at which the chain regulator intervenes during the formation of the PA block, but also on the various reagents that have reacted randomly, which are randomly (statistically) distributed along the polymer chain.

Copolymers formed from polyamide blocks and polyether blocks which have advantageous mechanical, thermal and optical properties have been sought for a certain number of years. Various approaches have been envisaged for solving this problem. In document WO 2008/006987, the specific choice of a particular monomer, such as cycloaliphatic diamines, makes it possible to obtain transparent materials.

SUMMARY OF THE INVENTION

The Applicant Company has now discovered that the presence of at least two different polyamide blocks assembled with at least one polyether block in a specific manner makes it possible to have advantageous mechanical, optical and thermal properties. In point of fact, it is possible to increase the transparency of the material or the thermal properties by appropriately selecting the chemical nature of the two polyamide blocks.

The subject of the present invention is thus a copolymer comprising at least two different polyamide blocks and at least one polyether block.

The invention also relates to a process for preparing this copolymer, and also to the uses thereof, especially for manufacturing sports articles.

The invention also relates to a fashioned article comprising the copolymer according to the invention.

Other characteristics, aspects, subjects and advantages of the present invention will emerge even more clearly on reading the description and the examples that follow.

DETAILED DESCRIPTION OF CERTAIN EMBODIMENTS OF THE INVENTION

The nomenclature used to define polyamides is described in ISO standard 1874-1:1992 *"Plastics—Polyamide (PA) materials for molding and extrusion—Part 1: Designation"*, especially on page 3 (tables 1 and 2) and is well known to those skilled in the art.

It is moreover pointed out that the expressions "between . . . and . . . " and "from . . . to . . . " used in the present description should be understood as including each of the mentioned limits. For the purposes of the present invention, the term "block" means a polymer segment of the same nature, namely polyamide or polyether. This polymer block may be constituted of a homopolymer or of a random or block copolymer.

The Polyamide Blocks

One of the essential conditions concerning the structure of the copolymer according to the invention is that the polyamide blocks, which may be noted $PA_1$ and $PA_2$, are different, i.e. of different chemical structure.

The PA blocks may have carboxylic acid ends, and are then referred to as dicarboxylic acid PA. They may also have amine ends, and are referred to as diamine PA. The bonds between the PA blocks and the PE blocks may be ester bonds or amide bonds.

The polyamide block may be either of "homopolyamide" structure, i.e. derived from the polymerization of only one monomer, or of "copolyamide" structure derived from the polymerization of a mixture of at least two different monomers.

The polyamide blocks are obtained in the presence of a dicarboxylic acid or of a diamine, which is a chain regulator, depending on whether polyamide blocks respectively bearing carboxylic acid or amine end groups are desired. If the precursors already comprise a dicarboxylic acid or a diamine, it suffices, for example, to use it in excess, but use may also be made of another dicarboxylic acid or another diamine taken from the groups of dicarboxylic acids and of diamines defined below.

The polyamide blocks may be constituted of:
(i) a homopolyamide structure derived from the polymerization,
 (a) of a lactam, in particular a $C_4$-$C_{12}$ lactam,
 (b) of an amino acid, in particular a $C_4$-$C_{12}$ amino acid,
 (c) of a (diamine.dicarboxylic acid) or "diamine.diacid" couple which is a product of condensation of a linear or branched $C_2$-$C_{40}$ aliphatic diamine, or of an aromatic, semi-aromatic or non-aromatic $C_6$-$C_{40}$ cyclic diamine and of an aliphatic or aromatic dicarboxylic acid, preferably a linear or branched $C_4$-$C_{40}$, preferably $C_6$-$C_{36}$ and even more preferentially $C_6$-$C_{18}$ aliphatic dicarboxylic acid; or
(ii) a copolyamide structure derived from the polymerization of a mixture of at least two units chosen from (a), (b) and (c).

As examples of lactams, mention may be made of caprolactam, oenantholactam and lauryllactam.

As examples of amino acids, mention may be made of aminocaproic, 7-aminoheptanoic, 11-aminoundecanoic and 12-aminododecanoic acids.

As examples of dicarboxylic acids, mention may be made of (i) aliphatic acids such as 1,4-cyclohexyldicarboxylic acid, butanedioic acid, adipic acid, azelaic acid, suberic acid, sebacic acid, pimelic acid, 1,7-heptanedioic acid, 1,8-octanedioic acid, 1,9-nonanedioic acid, 1,10-decanedioic acid, 1,11-undecanedioic acid, 1,12-dodecanedicarboxylic acid, 1,14-tetradecanedicarboxylic acid, 1,18-octadecanedicarboxylic acid, (ii) aromatic dicarboxylic acids such as terephthalic and isophthalic acids, but also (iii) dimerized fatty acids.

The dicarboxylic acids may be fatty acid dimers. The fatty acids are $C_4$-$C_{28}$ acids, even more preferentially $C_{12}$-$C_{24}$, advantageously $C_{14}$-$C_{22}$ and more especially fatty acids bearing a $C_{18}$ alkyl chain. Suitable fatty acid dimers are products of dimerization of two identical or different fatty acids, chosen from oleic acid, linoleic acid, linolenic acid, palmitoleic acid and elaidic acid. The products of dimerization of unsaturated fatty acid mixtures may be obtained by hydrolysis of plant oils or fats, for example sunflower oil, soybean oil, olive oil, rapeseed oil or cottonseed oil. Fatty acid dimers that are hydrogenated, for example using nickel catalysts, may also be used. Consequently, the dimerized fatty acid will advantageously comprise 8 to 56 carbon atoms and preferably 36 carbon atoms.

As regards the diamine, it is chosen from linear or branched aliphatic diamines, and aromatic, semi-aromatic or non-aromatic cyclic diamines. As examples of diamines, mention may be made of 1,4-tetramethylenediamine, 1,6-hexamethylenediamine, 1,9-nonamethylenediamine, 1,10-decamethylenediamine, 1,12-dodecamethylenediamine, trimethylhexamethylenediamine, bis(3-methyl-4-aminocyclohexyl)methane (BMACM or B) isomers, para-aminodicyclohexylmethane (PACM or P), 2,2-bis(3-methyl-4-aminocyclohexyl)propane (BMACP) isomers, 2,6-bis(aminomethyl)norbornane (BAMN) (doubled), isophoronediamine (IPDA) (doubled), m-xylenediamine (MXD) and piperazine (Pip).

The different polyamide blocks present in the copolymer according to the invention may be obtained by polymerization of one or more units chosen from: 6, 11, 12, 4.6, 4.12, 4.14, 4.18, 6.6, 6.10, 6.12, 6.14, 6.18, Pip10, 9.6, 9.12, 10.10, 10.12, 10.14, 10.18, 10.36, 10.T, 6.T, 9.T, MXD.6, MXD.10, B.10, B.12, B.14, B.18, B.36, P.10, P.12, P.14, P.18, P.36, and mixtures thereof.

In particular, the block PA1 comprises at least one monomer chosen from: 6, 11, 12, 4.6, 4.12, 4.14, 4.18, 6.6, 6.10, 6.12, 6.14, 6.18, Pip10, 9.6, 9.12, 10.10, 10.12, 10.14, 10.18, 10.T, 6.T, 9.T, MXD.6, MXD.10 and mixtures thereof in the form of copolyamides, for example PA 6/11, PA 6/12, PA 11/12, PA 10.10/10.12, PA 10.10/11 and PA 6/11/12.

Preferably, the block PA1 comprises at least one monomer chosen from: 6, 11, 12, 10.10, 10.12, 6.10, 6.12, 10.T, 6.T, 9.T, and mixtures thereof in the form of copolyamides, for example PA 6/11, PA 6/12, PA 11/12, PA 10.10/10.12, PA 10.10/11 and PA 6/11/12.

The weight percentage of blocks PA1 relative to the total weight of polyamide present in the copolymer is within the range from 50% to 99%, preferably 60% to 95% and more preferably 65% to 90%.

In particular, the block PA2 comprises at least one monomer chosen from 6, 11, 12, 4.6, 4.12, 4.14, 4.18, 6.6, 6.10, 6.12, 6.14, 6.18, Pip.10, 9.6, 9.12, 10.10, 10.12, 10.14, 10.18, 10.36, B.10, B.12, B.14, B.18, B.36, P.10, P.12, P.14, P.18, P.36, and mixtures thereof in the form of copolyamides, for example PA 6/11, PA 6/12, PA 11/12, PA 10.10/10.12, PA 10.10/11 and PA 6/11/12.

Preferably, the block PA2 comprises at least one monomer chosen from: B.10, B.12, B.14, B.18, B.36, P.10, P.12, P.14, P.18, P.36, and mixtures of these monomers in the form of copolyamides, such as PA B.10/B.12, PA B.12/B.14.

According to a preferred embodiment of the invention, the polyamide PA1 has a number of carbon atoms per nitrogen atom of greater than or equal to 8, and is preferably chosen from PA11, PA12, PA 10.10 and PA 6.10.

It is recalled that homopolyamides and copolyamides are distinguished by their number of carbon atoms per nitrogen atom, given that there are as many nitrogen atoms as there are amide groups (—CO—NH—).

In the case of a homopolyamide of PA-X.Y type, the number of carbon atoms per nitrogen atom is the mean of the unit X and of the unit Y.

In the case of copolyamides, the number of carbon atoms per nitrogen atom is calculated according to the same principle. The calculation is performed on a molar prorata of the various amide units.

A strongly carbon-based polyamide is a polyamide with a high content of carbon atoms (C) relative to the nitrogen atom (N). These are polyamides with at least about 9 carbon atoms per nitrogen atom, for instance polyamide-9, polyamide-12, polyamide-11, polyamide-10.10 (PA10.10), copolyamide 12/10.T, copolyamide 11/10.T, polyamide-12.T, polyamide-6.12 (PA6.12). T represents terephthalic acid.

A weakly carbon-based polyamide is a polyamide with a low content of carbon atoms (C) relative to the nitrogen atom (N). These are polyamides with less than about 9 carbon atoms per nitrogen atom, for instance polyamide-6, polyamide-6.6, polyamide-4.6, copolyamide-6.T/6.6, copolyamide 6.I/6.6, copolyamide 6.T/6.I/6.6, polyamide 9.T. I represents isophthalic diacid.

In the case of a homopolyamide of PA-X.Y type, the number of carbon atoms per nitrogen atom is the mean of the unit X and of the unit Y. Thus, PA6.12 is a PA containing 9 carbon atoms per nitrogen atom, in other words it is a $C_9$ PA. PA6.13 is $C_{9.5}$. PA-12.T is $C_{10}$, T, i.e. terephthalic acid, being $C_8$.

According to another embodiment of the invention, the polyamide PA2 has a number of carbon atoms per nitrogen atom of less than 8, and is preferably chosen from PA6 and PA6.6.

According to another embodiment, the minor block PA2 is chosen such that its melting point or its glass transition temperature (measured by DSC (differential scanning calorimetry) in accordance with standard ISO 11357) is greater than that of the block PA1. For example, for a block PA1 such as PA11 or PA12, a block such as PA6, PA6.6, PA10.10, PA6.10, PA6.12 or PA10.T may be taken for PA2.

The weight percentage of blocks PA in the copolymer is within the range from 20 to 99% relative to the total weight of the copolymer.

According to one embodiment, the number-average molecular mass of the polyamide blocks in the copolymer is between 500 and 20 000 g/mole, preferably between 600 and 15 000 g/mole, and more particularly between 600 and 10 000 g/mole.

The Polyether Block:

As for the polyamides, the polyether block may be a homopolymer or a random or block copolymer.

The PE blocks are polyalkylene ether polyol, especially polyalkylene ether diol. The PE blocks are chosen from polyethylene ether glycol (PEG), polypropylene ether glycol (PPG), polytetramethylene ether glycol (PTMG), polyhexamethylene ether glycol, polytrimethylene ether glycol (PO3G), poly(3-alkyl tetrahydrofuran) in particular poly(3-methyltetrahydrofuran (poly(3MeTHF)) and block or random copolymers thereof.

The chain ends of the PE blocks may be diols or diamines depending on their synthetic process. The PE blocks bearing amine chain ends may be obtained by cyanoacetylation of aliphatic alpha-omega-dihydroxylated polyoxyalkylene blocks known as polyether diols, such as the Elastamine® and Jeffamine® ranges from the company Huntsman.

The weight percentage of the polyether blocks in the copolymer is within the range from 1% to 80%, preferably from 4% to 50% and more preferably between 4% and 35%.

According to one embodiment, the number-average molecular mass of the polyether blocks in the copolymer is between 100 and 5000 g/mole, preferably between 200 and 2000 g/mole.

Preferably, the copolymer according to the invention comprises ester bonds between each of the blocks.

According to this embodiment, the PA block ends with acid functions and the PE block ends with alcohol functions, so as to form an ester bond between the two blocks.

Arrangement of the Blocks

The block copolymer according to the invention comprises at least two polyamide blocks of different chemical structure (PA1 and PA2) assembled with at least one polyether (PE) block in a specific manner.

The two polyamide blocks PA1 and PA2 are linked together via an intermediate polyether PE block. The structure of the block copolymer according to the invention may be defined by the following scheme: PA1-PE-PA2.

In other words, the copolymer according to the invention may be defined as a copolymer bearing alternating PA and PE blocks, of which at least two PA are of different chemical structure.

Process

The invention also relates to a process for preparing the copolymer as defined above.

The process comprises the following steps:
  in a first step, the polyamide block $PA_1$ is prepared by polycondensation of monomers chosen from: amino acids, lactams or diamines and dicarboxylic acids; in the presence of a suitable chain limiter;
  next, in an optional second step, the polyamide block $PA_1$ obtained is reacted with all or some of the polyether blocks PE, in the presence or absence of catalyst;
  in a third step, the polyamide block $PA_2$ is prepared by polycondensation of monomers chosen from: amino acids, lactams or diamines and dicarboxylic acids; in the presence of a suitable chain limiter;
  in an optional fourth step, the polyamide block $PA_2$ obtained is reacted with all or some of the polyether blocks PE, in the presence or absence of a catalyst,
  in a fifth step, PA1 or the reaction medium derived from step 2 is reacted with PA2 or the reaction medium derived from step 4, and with PE or the residual PE not added in step 2 or 4. The reaction may take place in a first stage without catalyst, followed by addition of catalyst. The addition of catalyst may take place, for example, after or during the addition of the residual PE, if necessary.

According to a first embodiment of the process according to the invention, it comprises the following steps:
  Preparation of the polyamide PA1,
  Preparation of the polyamide PA2,
  Mixing and reacting of the polyamides PA1 and PA2 in the presence of the polyether PE.

More particularly, the process comprises the following steps:
  in a first step, the block polyamide $PA_1$ is prepared by polycondensation of monomers chosen from: amino acids, lactams or diamines and dicarboxylic acids; in the presence of a suitable chain limiter;
  in a second step, the polyamide block $PA_2$ is prepared by polycondensation of monomers chosen from: amino acids, lactams or diamines and dicarboxylic acids; in the presence of a suitable chain limiter;
  in a third step, $PA_1$, $PA_2$ are reacted with PE.

According to a second embodiment of the process according to the invention, it comprises the following successive steps:
  Preparation of the polyamide PA1,
  Preparation of the polyamide PA2,
  Mixing and reacting of the polyamide PA1 with part of the polyether PE,
  Mixing and reacting of the polyamide PA2 with part of the polyether PE,
  Mixing and reacting of the two reaction media in the presence of polyether PE.

More particularly, the process comprises the following steps:
  in a first step, the polyamide block $PA_1$ is prepared by polycondensation of monomers chosen from: amino acids, lactams or diamines and dicarboxylic acids; in the presence of a suitable chain limiter;
  then, in a second step, the polyamide block $PA_1$ obtained is reacted with all or part of the polyether blocks PE, in the presence or absence of catalyst;
  in a third step, the polyamide block $PA_2$ is prepared by polycondensation of monomers chosen from: amino acids, lactams or diamines and dicarboxylic acids; in the presence of a suitable chain limiter;
  in a fourth step, the polyamide block $PA_2$ obtained is reacted with all or part of the polyether blocks PE, in the presence or absence of a catalyst,
  in a fifth step, the reaction medium derived from step 2 is reacted with the reaction medium derived from step 4, with the residual PE not added in step 2 or 4.

According to a third embodiment of the process according to the invention, it comprises the following steps:

Preparation of the polyamide PA1,

Preparation of the polyamide PA2,

Mixing and reacting of one of the two polyamides with part of the polyether PE,

Mixing and reacting of the reaction medium obtained from the preceding step in the presence of the second polyamide (that which has not yet been placed in contact with the polyether PE), and optionally with the residual polyether PE, if necessary.

In the processes described above, the reactions between the polyamide(s) and the polyether may take place with or without catalyst, this catalyst possibly being introduced in one or more steps. Preferably, the reaction takes place in a first stage without catalyst, followed by addition of catalyst after the addition of the residual PE.

The general method for preparing polyamides and for reacting a polyamide with a polyether is known and is described, for example, in French patent FR 2 846 332 and in European patent EP 1 482 011.

It is also possible to add during the synthesis, at the time judged to be the most appropriate, one or more molecules used as antioxidant, for example Irganox® 1010 or Irganox® 245.

Advantageously, a derivative of a metal chosen from the group formed by titanium, zirconium and hafnium or a strong acid such as phosphoric acid, hypophosphorous acid or boric acid is used as catalyst. The polycondensation may be performed at a temperature of from 220 to 280° C., preferably between 230 and 250° C.

The copolymer according to the invention may be used in compositions which may also comprise: dyes, bleaching agents, UV absorbers, antioxidants, stabilizers, softeners, plasticizers, impact modifiers, reinforcing agents, nucleating agents, and mixtures thereof.

Use

The present invention also relates more particularly to the use of a copolymer as defined above.

The copolymer according to the invention may be used alone or as an additive. It may serve for the manufacture, totally or partially, of fashioned articles, such as fibers, fabrics, films, sheets, rods, tubes or injected-molded components.

Article

The invention also relates to a fashioned article comprising the copolymer as defined above or prepared via a process as defined above.

In other words, the invention also relates to a component formed totally or partially from the copolymer according to the invention, and also to the uses of such a component.

Thus, the article is advantageously fashioned for sports shoe elements, sports tools such as ice skates, ski attachments, rackets, sports bats, boards, horseshoes, flippers, golf balls, leisure articles, handicraft articles, road maintenance tools or equipment that are subject to climatical and mechanical attack, protective articles such as helmet or hat visors, spectacles, spectacle arms, vehicle components (in particular for scooters, mopeds, motorbikes, cars or bicycles) such as headlamp protectors, rear-view mirrors, small parts for all-road vehicles, tanks or conveyor belts. A certain number of patents or patent applications including U.S. Pat. No. 4,858,924 and U.S. Pat. No. 4,919,434, in the field of golf balls, mention elastomeric polyamide materials used for manufacturing the outer or intermediate layers of a golf ball.

Other aims and advantages of the present invention will emerge on reading the following examples, which are given as a guide and are not in any way limiting.

EXAMPLES

Example 1: Preparation of a Copolymer PEBA1 According to the Invention

Synthesis of the PA6 Block 1400 g of lactam 6, 110.36 g of adipic acid and 98 g of water are placed in an autoclave. The material temperature is 280° C. The system is maintained for 3 hours at a pressure of 22 bar, and is then depressurized over about 1 hour and flushed with nitrogen for 30 minutes.

Synthesis of the PA12 Block 1400 g of lactam 12, 110.36 g of adipic acid and 98 g of water are placed in an autoclave. The material temperature is 280° C. The system is maintained for 3 hours at a pressure of 22 bar, and is then depressurized over about 1 hour and flushed with nitrogen for 30 minutes.

Synthesis of PEBA1: -[PA6-PTMG]-[PA12-PTMG]-

8.15 g of PA6 are reacted with 32.6 g of PA12 block and 19.25 g of PTMG in a glass tube, over 1 hour while flushing with nitrogen. The nominal temperature is 250° C., and the mixture is stirred for 1 hour under nitrogen. 0.3% of $Zr(OBu)_4$ is then added and the system is placed under reduced pressure (<10 mbar). The evolution of the torque is monitored to stop the test, when a sufficient torque is reached.

The PEBA1 obtained is analyzed by DSC and gives a melting point of 156° C.

Example 2: Preparation of a Copolymer PEBA2 According to the Invention

Synthesis of PEBA2: -[PA6-PTMG]-[PA12-PTMG]-

The polyamides PA6 and PA12 are identical to those described in example 1.

8.15 g of PA6 are placed in a glass tube equipped with an anchor, along with 32.6 g of PA12 block and 19.25 g of PTMG. The nominal temperature is 250° C. Without an intermediate step under nitrogen, 0.3% by weight of $Zr(OBu)_4$ is added and the system is placed under reduced pressure (<10 mbar). The evolution of the torque is monitored to stop the test when a sufficient torque is reached.

The PEBA2 obtained is analyzed by DSC and gives a melting point of 165° C.

Example 3: Preparation of a Comparative Copolymer PEBA3

Synthesis of the PA6/12 Block 300 g of lactam-6 and 1200 g of lactam-12, 118.25 g of adipic acid and 113.28 g of water are placed in an autoclave. The material temperature is 280° C. The system is maintained for 3 hours at a pressure of 22 bar, and is then depressurized over about 1 hour and flushed with nitrogen for 30 minutes.

Synthesis of PEBA3: -[PA6/12-PTMG]-

55 g of PA6/12 block are placed in a glass tube equipped with an anchor, along with 17 g of PTMG. The nominal temperature is 250° C. 0.3% by weight of $Zr(OBu)_4$ is then added and the system is placed under reduced pressure (<10 mbar). The evolution of the torque is monitored to stop the test when a sufficient torque is reached.

The PEBA3 obtained is analyzed by DSC and gives a melting point of 141° C.

It is clearly seen that PEBA1 and PEBA2 have a higher melting point than that of PEBA3.

Example 4: Preparation of a Copolymer PEBA4 According to the Invention

The same PA12 block as for example 1 is used.
Synthesis of the PAB.12 Block 2289 g of BMACM, 2829 g of dodecanedioic acid and 100 g of water are placed in an autoclave. The material temperature is 250° C. The system is maintained for 3 hours at a pressure of 25 bar, and is then depressurized over about 30 minutes and flushed with nitrogen for 60 minutes.
Synthesis of PEBA4: -[PA12-PTMG]-[PAB.12-PTMG]-

23.5 g of PA12 are placed in a glass tube equipped with an anchor, along with 25 g of PAB.12 block and 20.2 g of PTMG. The nominal temperature is 250° C. 0.3% by weight of $Zr(OBu)_4$ is then added and the system is placed under reduced pressure (<10 mbar). The evolution of the torque is monitored to stop the test when a sufficient torque is reached.

The PEBA4 obtained has very good transparency and a high modulus at 23° C. of about 490 MPa (DMA measurement).

Example 5: Preparation of a Comparative Binary Mixture

A PEBA of structure -[PAB.12(0.5)/B.14(0.5)-PTMG]- is prepared according to the following procedure:

PEBAs were prepared from PA blocks based on cycloaliphatic diamine according to the following procedure: cycloaliphatic diamine and diacids are placed in an 80l autoclave. The reactor is flushed with nitrogen and closed, and heated at 260° C. under pressure and with stirring at 40 rpm. After maintenance for one hour, the system is depressurized to atmospheric pressure and the polyether and the catalyst are added. The reactor is placed under vacuum for 30 minutes to reach 50 mbar (20 mbar if necessary). The rise in torque lasts about two hours. Once the viscosity has been reached, the reactor is returned to atmospheric pressure and the product is granulated and dried under vacuum at 75° C.

This copolymer is then mixed with a semicrystalline PEBA of structure -[PA12-PTMG]- in a 50:50 content.

The composition obtained has very good transparency and a high modulus at 23° C. of about 430 MPa (DMA measurement).

The results are given in the table below:

|  | Ex 5: -[PAB.12(0.5)/B.14(0.5)-PTMG]- + -[PA12-PTMG] | Ex 4: PEBA4:-[PA12-PTMG]-[PAB.12-PTMG]- |
|---|---|---|
| E' flexibility (MPa) | 430 | 490 |
| Transparency | Very satisfactory | Very satisfactory |

These results show that the copolymer according to the invention leads to a material that is more flexible and transparent. Furthermore, its synthetic process is much more economical and easy to perform, given that it only requires a single step.

The invention claimed is:

1. A copolymer comprising at least two polyamide blocks of different chemical structure, including a first polyamide block PA1 and a second polyamide block PA2, and at least one polyether block, wherein the first polyamide block PA1 has a number of carbon atoms per nitrogen atom of greater than or equal to 8 and the second polyamide block PA2 has a number of carbon atoms per nitrogen atom of less than 8.

2. The copolymer as claimed in claim 1, wherein an ester bond is present between each of the blocks.

3. The copolymer as claimed in claim 1, wherein the different polyamide blocks are obtained by polymerization of one or more units chosen from: 6, 11, 12, 4.6, 4.12, 4.14, 4.18, 6.6, 6.10, 6.12, 6.14, 6.18, Pip.10, 9.6, 9.12, 10.10, 10.12, 10.14, 10.18, 10.36, 10.T, 6.T, 9.T, MXD.6, MXD.10, B.10, B.12, B.14, B.18, B.36, P.10, P.12, P.14, P.18, P.36, and mixtures thereof.

4. The copolymer as claimed in claim 1, wherein the second polyamide block PA2 is selected to have a melting point or a glass transition temperature which is greater than that of the first polyamide block PA1.

5. The copolymer as claimed in claim 4, wherein the weight percentage of PA1 blocks relative to the total weight of polyamide present in the copolymer is within the range from 50% to 99%.

6. The copolymer as claimed in claim 1, wherein the polyether block is selected from the group consisting of polyethylene ether glycol (PEG), polypropylene ether glycol (PPG), polytetramethylene ether glycol (PTMG), polyhexamethylene ether glycol, polytrimethylene ether glycol (PO3G), and poly(3-alkyl tetrahydrofuran) and block or random copolymers thereof.

7. The copolymer as claimed in claim 1, wherein the weight percentage of polyether blocks in the copolymer is within the range of 1% to 80%.

8. The copolymer as claimed in claim 1, wherein the copolymer comprises a plurality of different polyether blocks.

9. A process for preparing a copolymer as defined in claim 1, comprising the following steps:
    in a first step, a polyamide block PA1 is prepared by polycondensation of monomers selected from the group consisting of: amino acids, lactams and combinations of diamines and dicarboxylic acids; in the presence of a suitable chain limiter;
    next, in an optional second step, the polyamide block PA1 obtained is reacted with all or some of the polyether blocks PE, in the presence or absence of catalyst;
    in a third step, a polyamide block PA2 is prepared by polycondensation of monomers selected from the group consisting of: amino acids, lactams and combinations of diamines and dicarboxylic acids; in the presence of a suitable chain limiter;
    in an optional fourth step, the polyamide block PA2 obtained is reacted with all or some of the polyether blocks PE, in the presence or absence of a catalyst,
    in a fifth step, PA1 or the reaction medium derived from step 2 is reacted with PA2 or the reaction medium derived from step 4, and with PE or the residual PE not added in step 2 or 4.

10. A process for preparing a copolymer as defined in claim 1, comprising the following steps:
    preparing a polyamide PA1,
    preparing a polyamide PA2,
    mixing and reacting the polyamides PA1 and PA2 in the presence of a polyether PE.

11. A process for preparing a copolymer as defined in claim 1, comprising the following steps:
    preparing a polyamide PA1,
    preparing a polyamide PA2,
    mixing and reacting the polyamide PA1 with part of a polyether PE to obtain a first reaction medium, mixing and reacting the polyamide PA2 with part of the polyether PE to obtain a second reaction medium, mixing and reacting the first and second reaction media in the presence of polyether PE.

12. A process for preparing a copolymer as defined in claim 1, comprising the following steps:

preparing a polyamide PA1, preparing a polyamide PA2, mixing and reacting one of the two polyamides PA1 and PA2 with part of a polyether PE, mixing and reacting the reaction medium obtained from the preceding step in the presence of the second polyamide, and with the residual polyether PE.

13. A method for manufacturing, totally or partially, a fashioned article selected from the group consisting of fibers, fabrics, films, sheets, rods, tubes and injection-molded components, comprising using a copolymer as defined in claim 1.

14. A fashioned article comprising a copolymer as defined in claim 1.

15. The fashioned article as claimed in claim 14, wherein the fashioned article consists of: a sports article or component of a sports article selected from the group consisting of a sports shoe element and a sports tool; a road maintenance tool or equipment that is subject to climatic and mechanical attack; a protective article; spectacles; spectacle arms; a vehicle component; small parts for all-road vehicles; a tank; or a conveyor belt.

* * * * *